US011250378B2

(12) United States Patent
Ishiyama et al.

(10) Patent No.: US 11,250,378 B2
(45) Date of Patent: Feb. 15, 2022

(54) AIRCRAFT TIRE MANAGEMENT SYSTEM, AIRCRAFT TIRE MANAGEMENT DEVICE, AND AIRCRAFT TIRE PROGRAM

(71) Applicant: BRIDGESTONE CORPORATION, Tokyo (JP)

(72) Inventors: Makoto Ishiyama, Tokyo (JP); Takumi Kakara, Tokyo (JP); Daisuke Hotta, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/640,230

(22) PCT Filed: Jul. 24, 2018

(86) PCT No.: PCT/JP2018/027660
§ 371 (c)(1),
(2) Date: Feb. 19, 2020

(87) PCT Pub. No.: WO2019/039171
PCT Pub. Date: Feb. 28, 2019

(65) Prior Publication Data
US 2020/0364651 A1 Nov. 19, 2020

(30) Foreign Application Priority Data

Aug. 22, 2017 (JP) .............................. JP2017-159141

(51) Int. Cl.
*G06Q 10/08* (2012.01)
*B64F 5/60* (2017.01)
(Continued)

(52) U.S. Cl.
CPC ............. *G06Q 10/087* (2013.01); *B64F 5/40* (2017.01); *B64F 5/50* (2017.01); *B64F 5/60* (2017.01);
(Continued)

(58) Field of Classification Search
CPC . G06Q 10/087; B64F 5/60; B64F 5/40; B64F 5/50
See application file for complete search history.

(56) References Cited

U.S. PATENT DOCUMENTS 8,788,312 B2 * 7/2014 Wetzer ........... G06Q 10/063112
705/7.26
2002/0163245 A1 11/2002 Watanabe et al.
(Continued)

FOREIGN PATENT DOCUMENTS

JP 2002-137770 A 5/2002
JP 2005-138738 A 6/2005
(Continued)

OTHER PUBLICATIONS

International Search Report for PCT/JP2018/027660 dated Sep. 18, 2018 [PCT/ISA/210].
(Continued)

*Primary Examiner* — Vanel Frenel
(74) *Attorney, Agent, or Firm* — Sughrue Mion, PLLC

(57) ABSTRACT

An aircraft tire management system includes a management device capable of communicating with a tire manufacturer, an MRO-providing company, and an airline through a network, and an acquisition device configured to acquire tire individual information on aircraft tires and wheel individual information on wheels. The acquisition device sends the tire individual information acquired in the tire manufacturer to the management device, sends the tire individual information and the wheel individual information on each aircraft tire fitted on the corresponding wheel acquired in the MRO-providing company to the management device, and sends the wheel individual information acquired in the airline to the management device. The management device links the tire individual information with the wheel individual information, and outputs tire management information including at least tire identification information, location information, and date and time information.

5 Claims, 12 Drawing Sheets

(51) Int. Cl.
  *B64F 5/40*   (2017.01)
  *B64F 5/50*   (2017.01)
  *G06Q 10/00*  (2012.01)
  *G06Q 30/00*  (2012.01)
  *G06Q 50/04*  (2012.01)

(52) U.S. Cl.
  CPC ..... *G06Q 10/0833* (2013.01); *G06Q 10/0838* (2013.01); *G06Q 10/20* (2013.01); *G06Q 30/0185* (2013.01); *G06Q 50/04* (2013.01)

(56) References Cited

U.S. PATENT DOCUMENTS

| | | | |
|---|---|---|---|
| 2012/0123911 A1 | 5/2012 | Kirian et al. | |
| 2015/0101702 A1* | 4/2015 | Dean | B60C 23/003 141/4 |
| 2015/0128691 A1* | 5/2015 | Keller | B60C 23/0479 73/146.5 |
| 2015/0224831 A1* | 8/2015 | Miller | B60C 23/0479 701/32.4 |
| 2015/0232202 A1* | 8/2015 | Cox | B64F 5/40 701/34.2 |
| 2017/0326928 A1 | 11/2017 | Oomi | |

FOREIGN PATENT DOCUMENTS

| | | |
|---|---|---|
| JP | 2005-258988 A | 9/2005 |
| JP | 2016-107823 A | 6/2016 |
| WO | 2009073945 A1 | 6/2009 |

OTHER PUBLICATIONS

Communication dated Mar. 2, 2021, from the European Patent Office in European Application No. 18848887.8.

* cited by examiner

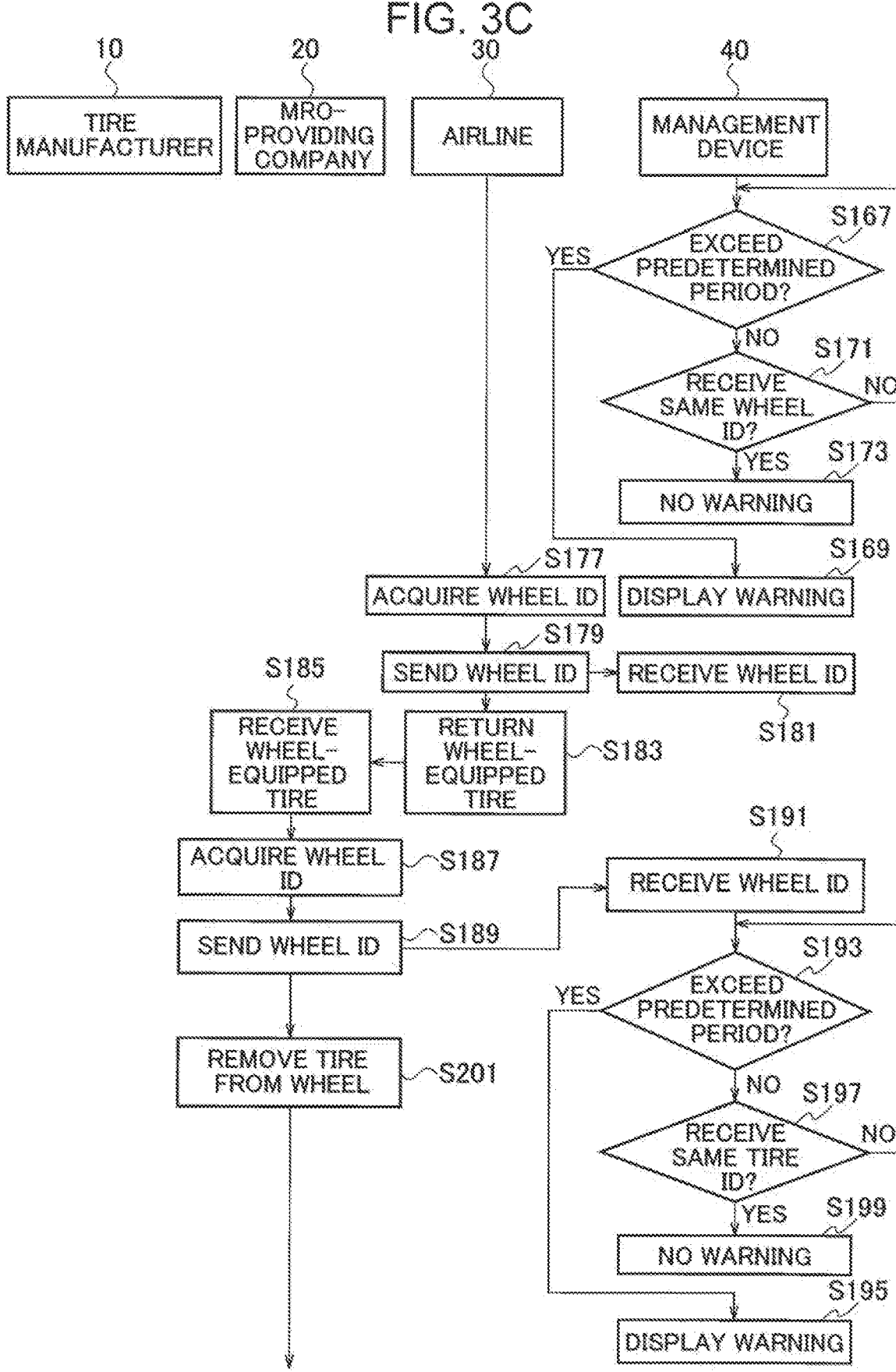

FIG. 4

| No. | TIRE ID | WHEEL ID | LOCATION | DATE&TIME | REFERENCE |
|---|---|---|---|---|---|
| ... | ... | ... | ... | ... | ... |
| 8 | T101 | — | WAREHOUSE | 2017.02.01 | DELIVERED FROM PLANT |
| 9 | T101 | — | WAREHOUSE | 2017.02.08 | SHIPPED TO MRO-PROVIDING COMPANY |
| 10 | T101 | — | MRO-PROVIDING COMPANY | 2017.02.08 | DELIVERED FROM WAREHOUSE |
| 11 | T101 | W101 | MRO-PROVIDING COMPANY | 2017.02.09 | FITTED ON WHEEL |
| 12 | T101 | W101 | MRO-PROVIDING COMPANY | 2017.02.10 | SHIPPED TO AIRLINE |
| 13 | T101 | W101 | AIRLINE | 2017.02.10 | DELIVERED FROM MRO-PROVIDING COMPANY |
| 14 | T101 | W101 | AIRLINE | 2017.05.10 | RETURNED TO MRO-PROVIDING COMPANY |
| 15 | T101 | W101 | MRO-PROVIDING COMPANY | 2017.05.10 | RETURNED FROM AIRLINE |
| 16 | T101 | — | MRO-PROVIDING COMPANY | 2017.05.11 | REMOVED FROM WHEEL |
| 17 | T101 | — | MRO-PROVIDING COMPANY | 2017.05.12 | RETURNED TO PLANT |
| 18 | T101 | — | PLANT | 20.17.05.12 | RETURNED FROM MRO-PROVIDING COMPANY |
| ... | ... | ... | ... | ... | ... |

FIG. 6

| WHEEL ID | TIRE ID | | | | | | | | TIRE-IN-USE |
|---|---|---|---|---|---|---|---|---|---|
| | T101 | T102 | T103 | T104 | T105 | T106 | T107 | T108 | |
| W101 | VACANCY | VACANCY | VACANCY | VACANCY | VACANCY | VACANCY | VACANCY | VACANCY | T102 |
| W102 | VACANCY | VACANCY | VACANCY | VACANCY | VACANCY | VACANCY | VACANCY | VACANCY | |
| W103 | VACANCY | VACANCY | VACANCY | VACANCY | VACANCY | VACANCY | VACANCY | VACANCY | |
| W104 | VACANCY | VACANCY | VACANCY | VACANCY | VACANCY | VACANCY | VACANCY | VACANCY | |
| W105 | VACANCY | VACANCY | VACANCY | VACANCY | VACANCY | VACANCY | VACANCY | VACANCY | |
| W106 | VACANCY | VACANCY | VACANCY | VACANCY | VACANCY | VACANCY | VACANCY | VACANCY | |

FIG. 7

| WHEEL ID | TIRE ID | | | | | | | TIRE-IN-USE | USED DAYS ON AIRCRAFT | STATE |
|---|---|---|---|---|---|---|---|---|---|---|
| | T101 | T102 | T103 | T104 | T105 | T106 | T107 | T108 | | | |
| W101 | - | IN USE | - | - | - | - | VACANCY | VACANCY | T102 | 10 | OK |
| W102 | - | - | IN USE | - | - | - | VACANCY | VACANCY | T103 | 5 | OK |
| W103 | - | - | - | - | IN USE | - | VACANCY | VACANCY | T105 | 3 | OK |
| W104 | IN USE | - | - | - | - | - | VACANCY | VACANCY | T101 | 4 | OK |
| W105 | - | - | - | IN USE | - | - | VACANCY | VACANCY | T104 | 12 | OK |
| W106 | - | - | - | - | - | IN USE | VACANCY | VACANCY | T106 | 5 | OK |

FIG. 8

| WHEEL ID | TIRE ID | | | | | | | TIRE-IN-USE | USED DAYS ON AIRCRAFT | STATE |
|---|---|---|---|---|---|---|---|---|---|---|
| | T101 | T102 | T103 | T104 | T105 | T106 | T107 | T108 | | | |
| W101 | - | IN USE | - | - | - | - | VACANCY | VACANCY | T102 | 40 | ERROR |
| W102 | - | - | IN USE | - | - | - | VACANCY | VACANCY | T103 | 35 | OK |
| W103 | - | - | - | - | IN USE | - | VACANCY | VACANCY | T105 | 33 | OK |
| W104 | IN USE | - | - | - | - | - | VACANCY | VACANCY | T101 | 34 | OK |
| W105 | - | - | - | IN USE | - | - | VACANCY | VACANCY | T104 | 42 | ERROR |
| W106 | - | - | - | - | - | IN USE | VACANCY | VACANCY | T106 | 35 | OK |

RETURNED TO PLANT

DELIVERED

| WHEEL ID | TIRE ID | | | | | | | | TIRE-IN-USE | USED DAYS ON AIRCRAFT | STATE |
|---|---|---|---|---|---|---|---|---|---|---|---|
| | T101 | T103 | T105 | T106 | T107 | T108 | T109 | T110 | | | |
| W101 | — | — | — | — | VACANCY → | VACANCY | VACANCY | VACANCY | →T107 | 1 | OK |
| W102 | — | IN USE | — | — | VACANCY | VACANCY | VACANCY | VACANCY | T103 | 36 | OK |
| W103 | — | — | IN USE | — | VACANCY | VACANCY | VACANCY | VACANCY | T105 | 34 | OK |
| W104 | IN USE | — | — | — | VACANCY | VACANCY | VACANCY | VACANCY | T101 | 35 | OK |
| W105 | — | — | — | — | VACANCY | (VACANCY) | VACANCY | VACANCY | →T108 | 1 | OK |
| W106 | — | — | — | IN USE | VACANCY | VACANCY | VACANCY | VACANCY | T106 | 36 | OK |

AIRCRAFT TIRE MANAGEMENT SYSTEM, AIRCRAFT TIRE MANAGEMENT DEVICE, AND AIRCRAFT TIRE PROGRAM

CROSS REFERENCE TO RELATED APPLICATIONS

This application is a National Stage of International Application No. PCT/JP2018/027660 filed Jul. 24, 2018, claiming priority based on Japanese Patent Application No. 2017-159141 filed Aug. 22, 2017.

TECHNICAL FIELD

The present invention relates to an aircraft tire management system, an aircraft tire management device, and an aircraft tire program.

BACKGROUND ART

A system is known that manages a usage history of tires (Patent Document 1). The management system disclosed in Patent Document 1 manages a usage history of tires including an exchange history in accordance with identification information on tires, installation positions of tires, and traveling distances detected at the time of exchange of tires, for example.

CITATION LIST

Patent Literature

Patent Document 1: Japanese Unexamined Patent Application Publication No. 2005-138738

SUMMARY OF INVENTION

The management system disclosed in Patent Document 1 is presumed to manage tires not for aircraft but for vehicles such as automobiles, trucks, and buses.

Tires for aircraft are distributed among at least three markets including tire manufacturers, companies providing maintenance, repair, and overhaul (MRO) service, and airlines. Tire manufacturers manufacture aircraft tires. Companies providing MRO service maintain, repair, and overhaul aircraft tires and wheels, for example. In particular, the companies providing MRO service mount and remove aircraft tires with respect to wheels. Airlines use aircraft tires to be mounted on aircraft. The aircraft tires and wheels are each allotted identification information. The tire manufacturers manage aircraft tires using the identification information allotted to each tire, while the companies providing MRO service and the airlines manage wheels using the identification information allotted to each wheel. The tire manufacturers thus need to track aircraft tires according to the identification information allotted to the corresponding wheels, which needs extra time to complicate the tracking of the aircraft tires.

To solve the conventional problems described above, the present invention provides an aircraft tire management system, an aircraft tire management device, and an aircraft tire program enabling efficient tracking of aircraft tires.

Technical Solution

An aircraft tire management system according to an aspect of the present invention includes a management device capable of communicating with a tire manufacturing facility, an MRO-providing facility, and an airline facility through a network, and an acquisition device configured to acquire tire individual information on aircraft tires and wheel individual information on wheels. The tire individual information includes at least tire identification information allotted to the respective aircraft tires, information on a location where the tire identification information is acquired, and information on a date and time when the tire identification information is acquired, and the wheel individual information includes at least wheel identification information allotted to the respective wheels, information on a location where the wheel identification information is acquired, and information on a date and time when the wheel identification information is acquired. The acquisition device sends the tire individual information acquired in the tire manufacturing facility to the management device, sends the tire individual information and the wheel individual information on each aircraft tire fitted on the corresponding wheel acquired in the MRO-providing facility to the management device, and sends the wheel individual information acquired in the airline facility to the management device. The management device links the tire individual information on each aircraft tire with the wheel individual information on the corresponding wheel fitted together in accordance with the information acquired from the acquisition device. The management device outputs tire management information including at least the tire identification information, the information on the location, and the information on the date and time.

The acquisition device sends, to the management device, the tire individual information or the wheel individual information acquired when each aircraft tire is delivered from the tire manufacturing facility to the MRO-providing facility, when the aircraft tire is shipped from the MRO-providing facility to the airline facility, when the aircraft tire is delivered to the airline facility from the MRO-providing facility, and when the airline tire is shipped from the airline facility to the MRO-providing facility. The management device determines whether a period from delivery to shipment of each aircraft tire in the MRO-providing facility or the airline facility exceeds a predetermined period in accordance with the information acquired from the acquisition device, and provides notice when the period from the delivery to the shipment is determined to exceed the predetermined period.

The management device presents a combination between the tire identification information on each aircraft tire and the wheel identification information on the corresponding wheel which can be fitted together.

Advantageous Effects

The present invention can facilitate the tracking of aircraft tires.

BRIEF DESCRIPTION OF DRAWINGS

FIG. 3C is a sequence diagram for explaining the example of operation of the aircraft tire management system according to the embodiment of the present invention.

FIG. 4 is a diagram illustrating tire management information according to the embodiment of the present invention.

FIG. 6 is a diagram illustrating combinations of tire IDs and wheel IDs according to the embodiment of the present invention.

FIG. 7 is a diagram illustrating the number of used days of aircraft tires according to the embodiment of the present invention.

FIG. 8 is a diagram illustrating the number of used days of the aircraft tires according to the embodiment of the present invention.

FIG. 9 is a diagram illustrating the number of used days of the aircraft tires according to the embodiment of the present invention.

DESCRIPTION OF EMBODIMENTS

Figure 1:
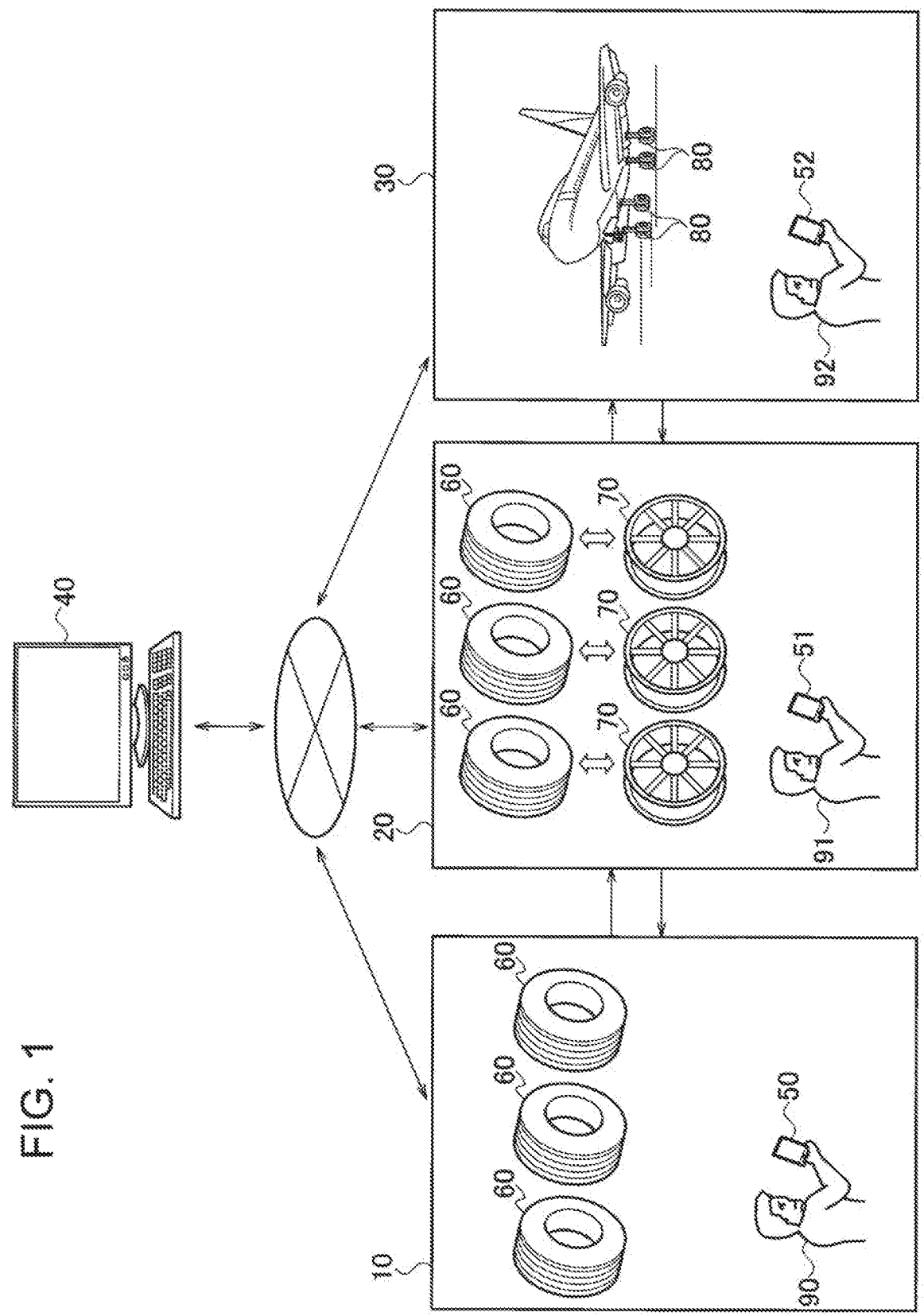
FIG. 1 is a schematic configuration diagram showing an aircraft tire management system according to an embodiment of the present invention.

Hereinafter, an embodiment according to the present invention will be described with reference to the drawings. The same elements illustrated with reference to the drawings are indicated by the same reference numerals, and overlapping explanations are not repeated below.

(Configuration of Aircraft Tire Management System)

A configuration of an aircraft tire management system is described below with reference to FIG. 1. As illustrated in FIG. 1, the aircraft tire management system includes a tire manufacturer 10, a company 20 providing MRO service, an airline 30, and a management device 40. The company 20 providing MRO service is hereinafter referred to as an "MRO-providing company 20" for brevity.

The tire manufacturer 10, the MRO-providing company 20, and the airline 30 each communicate with the management device 40 through a network. The management device 40 acquires pieces of information from the tire manufacturer 10, the MRO-providing company 20, and the airline 30 through the network. The network is a communications network capable of communicating various kinds of information. For example, the network is implemented by various types of communication lines, such as dedicated lines installed by telecommunications carriers, public switched telephone networks, satellite communication lines, and mobile communication lines. The management device 40 can be installed, but not necessarily, in each of the tire manufacturer 10, the MRO-providing company 20, and the airline 30. The management device 40 may be installed only in the tire manufacturer 10.

The tire manufacturer 10 (tire manufacturing facility) manufactures aircraft tires 60. An operator 90 in the tire manufacturer 10 acquires various kinds of information on the aircraft tires 60 by use of a mobile terminal 50. For example, the operator 90 acquires identification information on the aircraft tires 60 with the mobile terminal 50. The identification information refers to information for identifying the aircraft tires 60, and is allotted to the respective aircraft tires 60. The identification information is illustrated with serial numbers carved in the aircraft tires 60, but is not limited to this case. The identification information may be any of two-dimensional indented patterns molded in the aircraft tires 60, radio frequency identifiers (RFIDs) attached to the aircraft tires 60, or bar codes attached to the aircraft tires 60. The identification information on the respective aircraft tires 60 described below can be referred to simply as a "tire ID".

The MRO-providing company 20 (MRO-providing facility) provides maintenance, repair, and overhaul (MRO) service, and maintains, repairs, and overhauls the aircraft tires 60 and wheels 70. For example, the MRO-providing company 20 fits and removes the aircraft tires 60 with respect to the wheels 70. Some of the aircraft tires 60 fitted on the wheels 70 described below are referred to as "wheel-equipped tires 80" for illustration purposes. An operator 91 in the MRO-providing company 20 acquires various kinds of information on the aircraft tires 60 and the wheels 70 by use of a mobile terminal 51. For example, the operator 91 acquires identification information on the wheels 70 with the mobile terminal 51. The identification information on the wheels 70 refers to information for identifying the wheels 70, and is allotted to the respective wheels 70, as in the case of the tire IDs. The identification information on the respective wheels 70 described below can be referred to simply as a "wheel ID". The MRO-providing company 20 is not limited to a company, and may be a predetermined organization or a predetermined facility.

The airline 30 (airline facility) uses the wheel-equipped tires 80 to be mounted on an aircraft. An operator 93 in the airline 30 acquires various kinds of information on the wheels 70 of the wheel-equipped tires 80. For example, the operator 92 acquires wheel IDs by use of a mobile terminal 52. The airline 30 is not limited to a company, and may be a predetermined organization or a predetermined facility.

The mobile terminals 50, 51, and 52 can communicate with the management device 40 so as to transmit the acquired information to the management device 40. The respective mobile terminals 50, 51, and 52 have a function of recognizing the serial numbers (such as an optical character recognition function) from an image. The respective mobile terminals 50, 51, and 52 may include a reader for reading two-dimensional patterns, a bar code reader, or a RFID receiver. The respective mobile terminals 50, 51, and 52 are a portable device, such as a smartphone. The mobile terminals 50, 51, and 52 can acquire information on the date and time when the tire IDs or the wheel IDs are acquired. The mobile terminals 50, 51, and 52 can also acquire information on the location where the tire IDs or the wheel IDs are acquired, by a GPS, for example. The respective mobile terminals 50, 51, and 52 are not limited to a smartphone, and may be any device that can acquire the information. The mobile terminals 50, 51, and 52 are illustrated below with different devices, but may be the same device.

The configuration of the aircraft tire management system is described in more detail below with reference to FIG. 2. The management device 40 is a general-purpose microcomputer including a central processing unit (CPU), a memory, and an input-output unit, for example. The management device 40 includes a communication unit 41, an information processing unit 42, a storage device 43, and a display 44. The communication unit (acquisition unit) 41 communicates with the tire manufacturer 10, the MRO-providing company 20, and the airline 30 through the network. The information processing unit 42 processes various kinds of information acquired from the tire manufacturer 10, the MRO-providing company 20, and the airline 30. The storage device 43 stores the information processed by the information processing unit 42. The display 44 displays various kinds of information.

Figure 2:
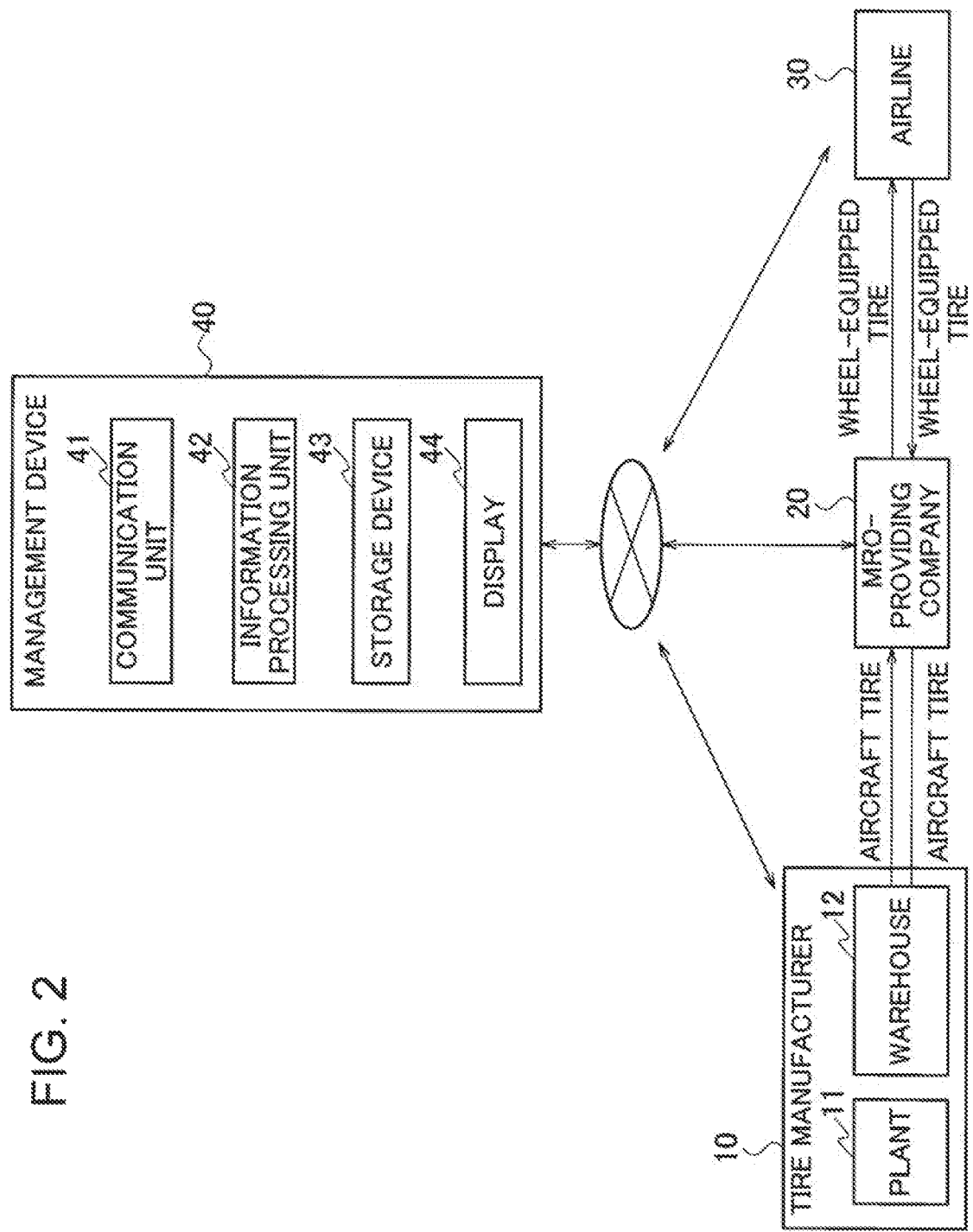
FIG. 2 is a specific configuration diagram showing the aircraft tire management system according to the embodiment of the present invention.
Figure 3A:
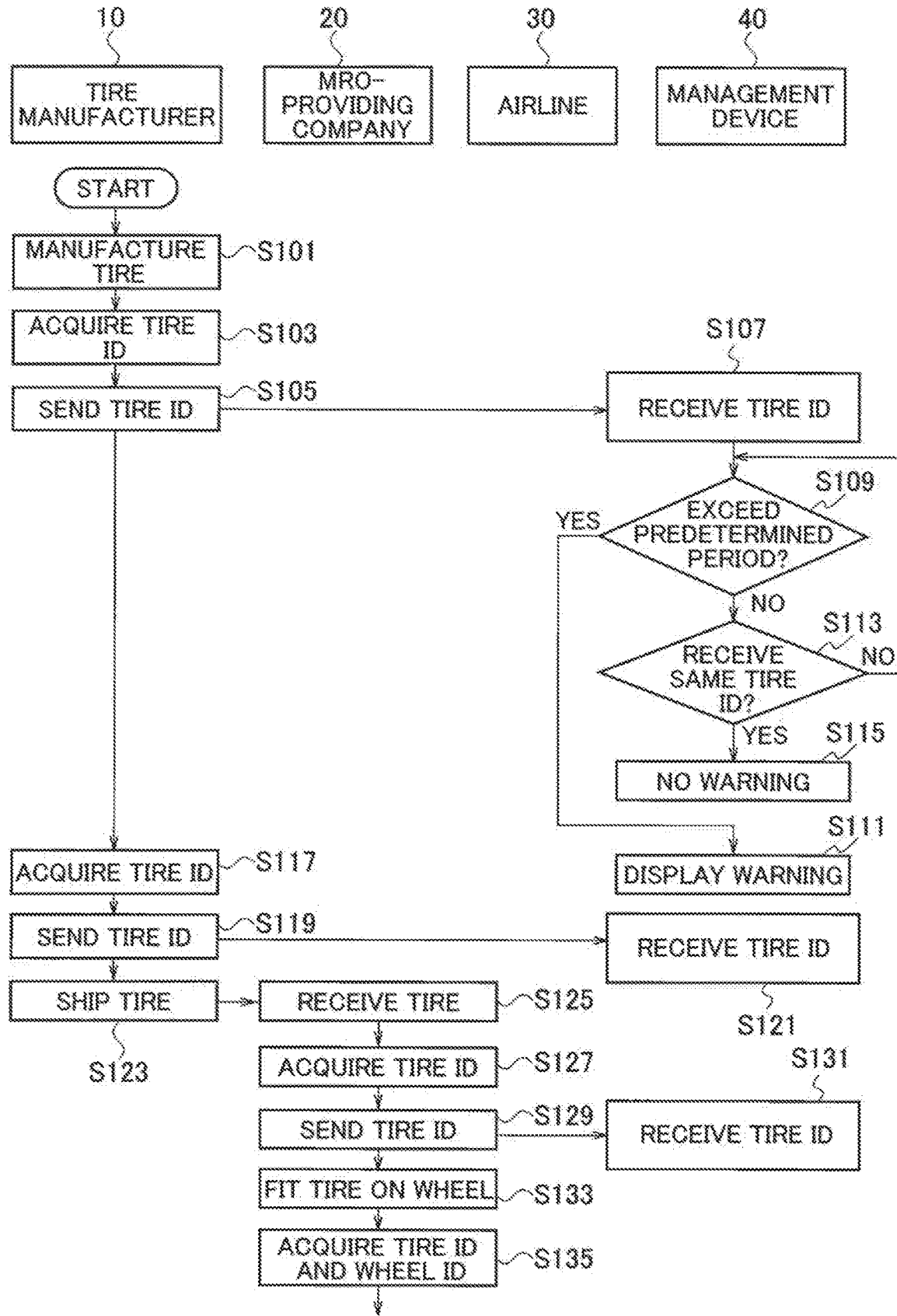
FIG. 3A is a sequence diagram for explaining an example of operation of the aircraft tire management system according to the embodiment of the present invention.
Figure 3B:
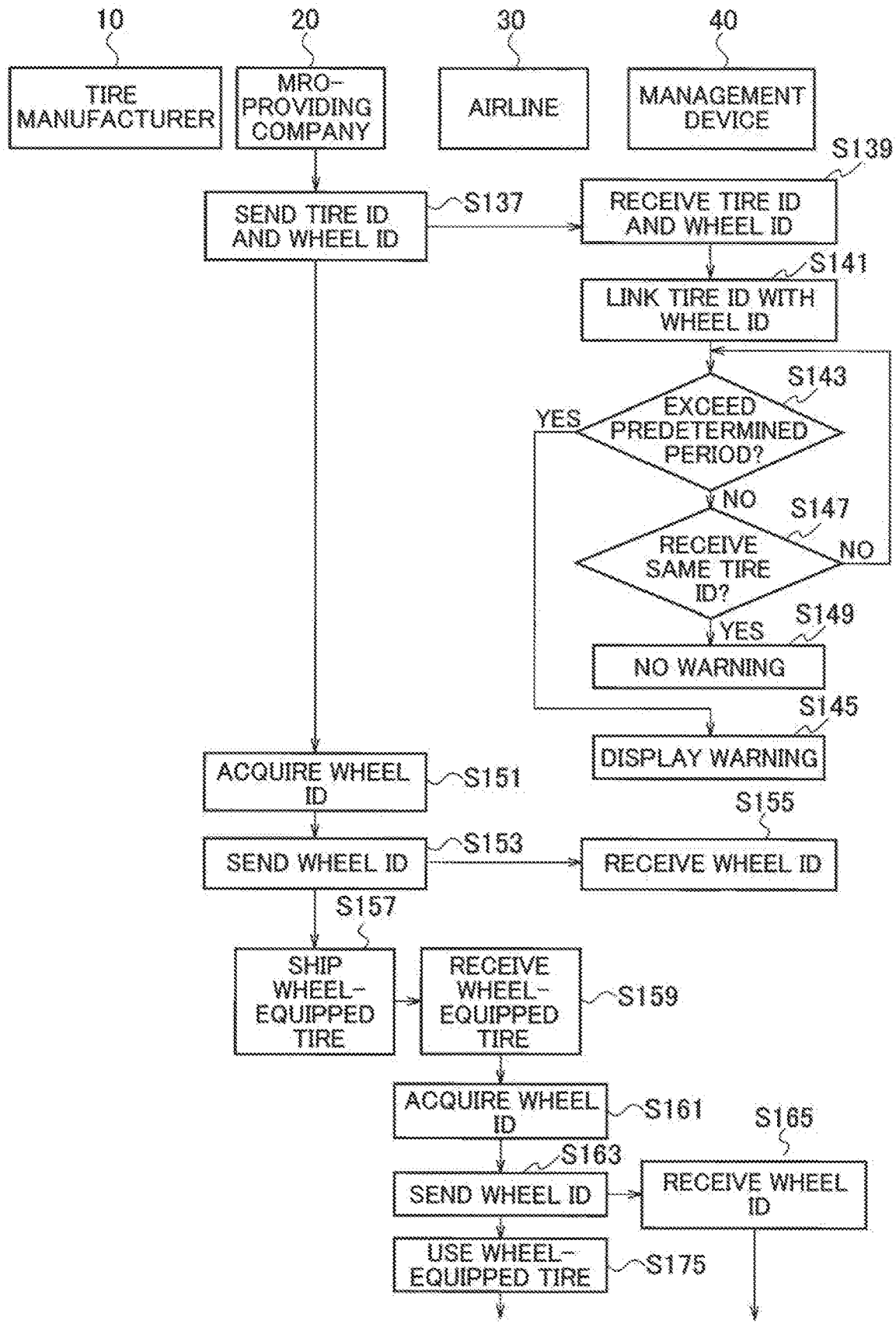
FIG. 3B is a sequence diagram for explaining the example of operation of the aircraft tire management system according to the embodiment of the present invention.
Figure 3D:
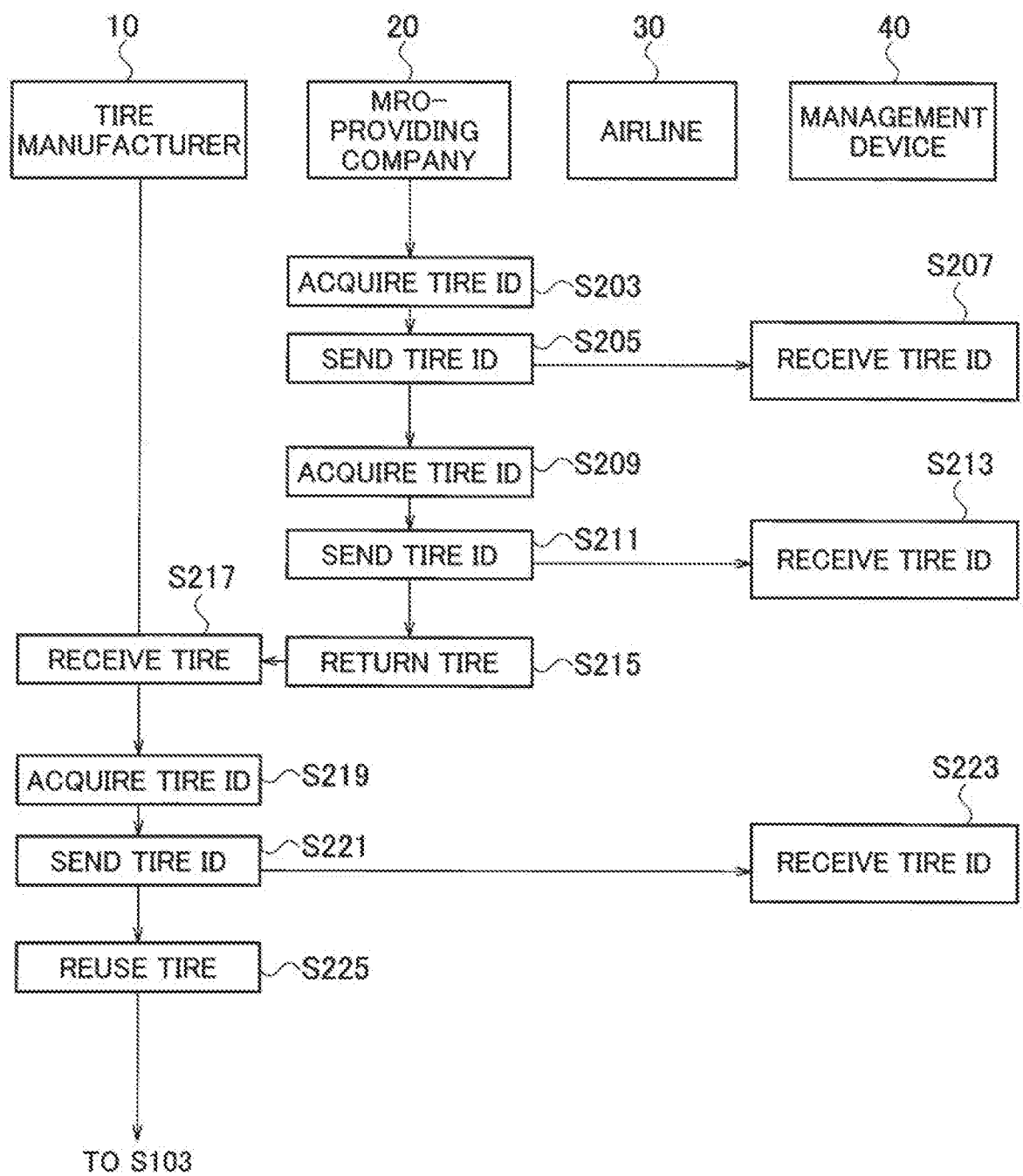
FIG. 3D is a sequence diagram for explaining the example of operation of the aircraft tire management system according to the embodiment of the present invention.

As shown in FIG. 2, the tire manufacturer 10 has a plant 11 and a warehouse 12. The tire manufacturer 10 manufactures the aircraft tires 60 in the plant 11, and stores the aircraft tires 60 in the warehouse 12. The tire manufacturer 10 ships the aircraft tires 60 from the warehouse 12 in accordance with the demand from the MRO-providing company 20.

The MRO-providing company 20 ships the wheel-equipped tires 80 in accordance with the demand from the airline 30.

The airline 30 uses the wheel-equipped tires 80 until the wheel-equipped tires 80 are worn out. The airline 30 returns the wheel-equipped tires 80 to the MRO-providing company 20 after being worn out.

The MRO-providing company 20, when receiving the worn wheel-equipped tires 80, removes the aircraft tires 60 from the wheels 70. The MRO-providing company 20 returns the worn aircraft tires 60 to the tire manufacturer 10 (to the warehouse 12).

The tire manufacturer 10 retreads the worn aircraft tires 60. The retreading is a process of recapping to attach a new rubber onto a tread rubber of a worn tire so as to reuse the tire.

(Example of Operation of Aircraft Tire Management System)

An example of operation of the aircraft tire management system is described below with reference to FIG. 3A to FIG. 3D, FIG. 4, and FIG. 5.

In step S101, the tire manufacturer 10 manufactures the aircraft tires 60 in the plant 11. The tire manufacturer 10 ships the manufactured aircraft tires 60 to the warehouse 12.

In step S103, the operator 90 in the tire manufacturer 10 acquires the tire ID of the corresponding aircraft tire 60 when being delivered to the warehouse 12 via the mobile terminal 50. The mobile terminal 50 acquires the location where the tire ID is acquired. The mobile terminal 50 acquires the location as the warehouse 12 where the tire ID is acquired in step S103. The mobile terminal 50 also acquires the information on the date and time when the tire ID is acquired.

In step S105, the operator 90 in the tire manufacturer 10 sends the acquired tire ID, location information, and date and time information to the management device 40 with the mobile terminal 50.

In step S107, the management device 40 receives the tire ID, the location information, and the date and time information sent in the step S105. The management device 40 prepares tire management information including the tire ID, the location information, and the date and time information, as shown in FIG. 4, and displays the prepared tire management information on the display 44. For example, the management device 40 prepares the tire management information including the tire ID, the location information, and the date and time information sent in the step S105, as indicated in item No. 8 in FIG. 4. Since the tire ID sent in step S105 is the first sent tire ID in the warehouse 12, the management device 40 can display an annotation indicating "delivered from the plant" in a reference column. The operator 90 in the tire manufacturer 10 thus can visually and immediately recognize that the aircraft tire 60 was delivered from the plant 11.

In step S117, the operator 90 in the tire manufacturer 10 acquires the tire ID, the location information, and the date and time information via the mobile terminal 50 when shipping the aircraft tire 60 to the MRO-providing company 20. In step S119, the operator 90 in the tire manufacturer 10 sends the acquired tire ID, location information, and date and time information to the management device 40 with the mobile terminal 50.

In step S121, the management device 40 receives the tire ID, the location information, and the date and time information sent in step S119. The management device 40 prepares the tire management information including the tire ID, the location information, and the date and time information sent in step S119, as indicated in item No. 9 in FIG. 4. Since the tire ID sent in step S119 is the second sent tire ID in the warehouse 12, the management device 40 can make an annotation indicating "shipped to the MRO-providing company" in the reference column. The operator 90 in the tire manufacturer 10 thus can visually and immediately recognize that the aircraft tire 60 is being shipped to the MRO-providing company 20.

In step S109, the management device 40 determines whether the period from which the tire ID is received in step S107 to which the same tire ID is received next exceeds a predetermined period. The predetermined period is a reference period during which the aircraft tires 60 are typically kept in the warehouse 12 (hereinafter referred to also as an "unshipped period"), and is set to ten days, for example. The predetermined period is not intended to be limited to ten days. FIG. 4 illustrates a case in which the unshipped period of the tire T101 in the warehouse 12 is eight days. Since the unshipped period of the tire T101 in the warehouse 12 shown in FIG. 4 does not exceed ten days (No in step S109), the management device 40 does not display any warning (in step S115).

Figure 5:
FIG. 5 is a diagram illustrating a warning screen of a management device according to the embodiment of the present invention.

In a case in which the unshipped period of the tire T101 in the warehouse 12 shown in FIG. 4 is 12 days, the management device 40 displays a warning on the display 44, as shown in FIG. 5, at the point when the unshipped period exceeds ten days (namely, on the 11th day) (in step S111). The operator 90 in the tire manufacturer 10 thus can visually and immediately recognize that the unshipped period of the aircraft tire 60 (the tire T101) exceeds the predetermined period. The management device 40 stops displaying the warning at the point when receiving the same tire ID on the 12th day (Yes in step S113). The warning is not necessarily displayed on the display 44. The management device 40 may provide the warning by voice, for example.

In step S123, the operator 90 in the tire manufacturer 10 ships the aircraft tire 60 to the MRO-providing company 20. In step S125, the operator 91 in the MRO-providing company 20 receives the aircraft tire 60.

In step S127, the operator 91 in the MRO-providing company 20 acquires the tire ID, the location information, and the date and time information of the aircraft tire 60 via the mobile terminal 51 when receiving the aircraft tire 60. In step S129, the operator 91 in the MRO-providing company 20 then sends the acquired tire ID, location information, and date and time information to the management device 40 with the mobile terminal 51.

In step S131, the management device 40 receives the tire ID, the location information, and the date and time information sent in step S129. The management device 40 then prepares the tire management information including the tire ID, the location information, and the date and time information sent in the step S129, as indicated in item No. 10 in FIG. 4. Since the tire ID sent in step S129 is the first sent tire ID in the MRO-providing company 20, the management device 40 can display an annotation indicating "delivered from the warehouse" in the reference column. The operator 90 in the tire manufacturer 10 thus can visually and immediately recognize that the aircraft tire 60 was delivered to the MRO-providing company 20.

In step S133, the operator 91 in the MRO-providing company 20 fits the aircraft tire 60 on the wheel 70.

In step S135, the operator 91 in the MRO-providing company 20 acquires the tire ID and the wheel ID via the mobile terminal 51. The tire ID and the wheel ID when the aircraft tire 60 is fitted on the wheel 70 are preferably managed in a linked state. The linkage between the tire ID and the wheel ID can allow the operator 90 in the tire manufacturer 10 to easily track the aircraft tire 60 only by inputting either ID. The operator 91 in the MRO-providing company 20 then acquires an image showing the aircraft tire 60 fitted to the wheel 70 via a rim with the tire ID and the wheel ID indicated in the same frame. The management device 40 thus can link the tire ID with the wheel ID indicated in the single image. The method of linking the tire ID and the wheel ID together is not limited to this case. For example, the management device 40 may measure the time from the reception of the tire ID to the reception of the wheel ID, and link the tire ID with the wheel ID together when the measured time is shorter than a predetermined time. Alternatively, the operator 91 in the MRO-providing company 20 may manually input and register the tire ID and the wheel ID when fitting the aircraft tire 60 to the wheel 70 via the rim.

In step S137, the operator 91 in the MRO-providing company 20 sends the acquired tire ID, wheel ID, location information, and date and time information to the management device 40 with the mobile terminal 51. In step S139, the management device 40 receives the tire ID, the wheel ID, the location information, and the date and time information sent in step S137.

In step S141, the management device 40 links the tire ID with the wheel ID sent in step S137. The management device 40 prepares the tire management information including the tire ID, the wheel ID, the location information, and the date and time information sent in the step S137, as indicated in item No. 11 in FIG. 4. Since the tire ID and the wheel ID are linked together as indicated in item No. 11 in FIG. 4, the operator 90 in the tire manufacturer 10 can easily track the aircraft tire 60 only by inputting either ID. The tire ID sent in step S137 is the second sent tire ID in the MRO-providing company 20, and the management device 40 can display an annotation indicating "fitted on the wheel" in the reference column. The operator 90 in the tire manufacturer 10 thus can visually and immediately recognize that the aircraft tire 60 was fitted on the wheel 70.

The operation from step S143 to step S149 is the same as the operation from step S109 to step S115, and specific explanations are not repeated below. The unshipped period of the aircraft tire 60 in the MRO-providing company 20 can be set to, but not limited to, five days.

In step S151, the operator 91 in the MRO-providing company 20 acquires the wheel ID, the location information, and the date and time information via the mobile terminal 51 when shipping the wheel-equipped tire 80 to the airline 30. The operator 91 in the MRO-providing company 20 may acquire the tire ID instead of the wheel ID, or may acquire both IDs.

In step S153, the operator 91 in the MRO-providing company 20 sends the acquired wheel ID, location information, and date and time information to the management device 40 with the mobile terminal 51.

In step S155, the management device 40 receives the wheel ID, the location information, and the date and time information sent in step S153. The management device 40 then prepares the tire management information including the wheel ID, the location information, and the date and time information sent in the step S153, as indicated in item No. 12 in FIG. 4. Since the information sent in step S153 is the third sent information in the MRO-providing company 20, the management device 40 can display an annotation indicating "shipped to the airline" in the reference column. The operator 90 in the tire manufacturer 10 thus can visually and immediately recognize that the wheel-equipped tire 80 is being shipped to the airline 30.

In step S157, the operator 91 in the MRO-providing company 20 ships the wheel-equipped tire 80 to the airline 30. In step S159, the operator 92 in the airline 30 receives the wheel-equipped tire 80.

In step S161, the operator 92 in the airline 30 acquires the wheel ID, the location information, and the date and time information of the wheel-equipped tire 80 via the mobile terminal 52 when receiving the wheel-equipped tire 80. In step S163, the operator 92 in the airline 30 then sends the acquired wheel ID, location information, and date and time information to the management device 40 with the mobile terminal 52.

In step S165, the management device 40 receives the wheel ID, the location information, and the date and time information sent in step S163. The management device 40 then prepares the tire management information including the wheel ID, the location information, and the date and time information sent in the step S163, as indicated in item No. 13 in FIG. 4. The airline 30 does not send the tire ID to the management device 40 since the airline 30 uses the wheel ID to manage the wheel-equipped tire 80. The management device 40, when receiving the wheel ID, can also display the tire ID which is linked with the corresponding wheel ID, as indicated in item No. 13 in FIG. 4.

Since the wheel ID sent in step S163 is the first sent wheel ID in the airline 30, the management device 40 can display an annotation indicating "delivered from the MRO-providing company" in the reference column. The operator 90 in the tire manufacturer 10 thus can visually and immediately recognize that the wheel-equipped tire 80 was delivered to the airline 30.

In step S175, the operator 92 in the airline 30 mounts the wheel-equipped tire 80 on the aircraft.

The operation from step S167 to step S173 is the same as the operation from step S109 to step S115, and specific explanations are not repeated below. The unshipped period of the wheel-equipped tire 80 in the airline 30 can be set to, but not limited to, one month.

In step S177, the operator 92 in the airline 30 returns the wheel-equipped tire 80 when being worn out to the MRO-providing company 20. The operator 92 in the airline 30 acquires the wheel ID, the location information, and the date and time information via the mobile terminal 52 when returning the wheel-equipped tire 80. In step S179, the operator 92 in the airline 30 sends the acquired wheel ID, location information, and date and time information to the management device 40 with the mobile terminal 52.

In step S181, the management device 40 receives the wheel ID, the location information, and the date and time information sent in step S179. The management device 40 then prepares the tire management information including the wheel ID, the location information, and the date and time information sent in the step S179, as indicated in item No. 14 in FIG. 4. Since the wheel ID sent in step S179 is the second sent wheel ID in the airline 30, the management device 40 can display an annotation indicating "returned to the MRO-providing company" in the reference column. The operator 90 in the tire manufacturer 10 thus can visually and immediately recognize that the wheel-equipped tire 80 is being returned to the MRO-providing company 20.

In step S183, the operator 92 in the airline 30 returns the wheel-equipped tire 80 to the MRO-providing company 20. In step S185, the operator 91 in the MRO-providing company 20 receives the wheel-equipped tire 80.

In step S187, the operator 91 in the MRO-providing company 20 acquires the wheel ID, the location information, and the date and time information of the wheel-equipped tire 80 via the mobile terminal 51 when receiving the wheel-equipped tire 80. The operator 91 in the MRO-providing company 20 may acquire the tire ID instead of the wheel ID, or may acquire both IDs.

In step S189, the operator 91 in the MRO-providing company 20 sends the acquired wheel ID, location information, and date and time information to the management device 40 with the mobile terminal 51.

In step S191, the management device 40 receives the wheel ID, the location information, and the date and time information sent in step S189. The management device 40 then prepares the tire management information including the wheel ID, the location information, and the date and time information sent in the step S189, as indicated in item No. 15 in FIG. 4. Since the wheel ID sent in step S189 is the first sent wheel ID in the MRO-providing company 20, the management device 40 can display an annotation indicating "returned from the airline" in the reference column. The operator 90 in the tire manufacturer 10 thus can visually and immediately recognize that the wheel-equipped tire 80 was returned from the airline 30.

The operation from step S193 to step S199 is the same as the operation from step S109 to step S115, and specific explanations are not repeated below. In step S201, the operator 91 in the MRO-providing company 20 removes the aircraft tire 60 from the wheel 70.

In step S203, the operator 91 in the MRO-providing company 20 acquires the tire ID, the location information, and the date and time information of the worn aircraft tire 60 via the mobile terminal 51. In step S205, the operator 91 in the MRO-providing company 20 sends the acquired tire ID, location information, and date and time information to the management device 40 with the mobile terminal 51.

In step S207, the management device 40 receives the tire ID, the location information, and the date and time information sent in step S205. The management device 40 then prepares the tire management information including the tire ID, the location information, and the date and time information sent in the step S205, as indicated in item No. 16 in FIG. 4. The management device 40 does not store the wheel ID since the aircraft tire 60 has been removed from the wheel 70. The tire ID sent in step S205 is the second sent tire ID in the MRO-providing company 20, and the management device 40 can display an annotation indicating "removed from the wheel" in the reference column. The operator 90 in the tire manufacturer 10 thus can visually and immediately recognize that the aircraft tire 60 was removed from the wheel 70.

In step S209, the operator 91 in the MRO-providing company 20 acquires the tire ID, the location information, and the date and time information via the mobile terminal 51 when returning the aircraft tire 60 to the plant 11. In step S211, the operator 91 in the MRO-providing company 20 sends the acquired tire ID, location information, and date and time information to the management device 40 with the mobile terminal 51.

In step S213, the management device 40 receives the tire ID, the location information, and the date and time information sent in step S211. The management device 40 then prepares the tire management information including the tire ID, the location information, and the date and time information sent in step S211, as indicated in item No. 17 in FIG. 4. Since the tire ID sent in step S211 is the third sent information in the MRO-providing company 20, the management device 40 can display an annotation indicating "returned to the plant" in the reference column. The operator 90 in the tire manufacturer 10 thus can visually and immediately recognize that the worn aircraft tire 60 is being returned to the plant 11.

In step S215, the operator 91 in the MRO-providing company 20 returns the worn aircraft tire 60 to the plant 11. In step S217, the operator 90 in the tire manufacturer 10 receives the worn aircraft tire 60.

In step S219, the operator 90 in the tire manufacturer 10 acquires the tire ID, the location information, and the date and time information of the worn aircraft tire 60 via the mobile terminal 50 when receiving the aircraft tire 60. In step S221, the operator 90 in the tire manufacturer 10 sends the acquired tire ID, location information, and date and time information to the management device 40 with the mobile terminal 50.

In step S223, the management device 40 receives the tire ID, the location information, and the date and time information sent in step S221. The management device 40 then prepares the tire management information including the tire ID, the location information, and the date and time information sent in step S221, as indicated in item No. 18 in FIG. 4. Since the information sent in step S153 is the first sent tire ID in the plant 11, the management device 40 can display an annotation indicating "returned from the MRO-providing company" in the reference column. The operator 90 in the tire manufacturer 10 thus can visually and immediately recognize that the aircraft tire 60 was returned from the MRO-providing company 20.

In step S225, the operator 90 in the tire manufacturer 10 retreads the aircraft tire 60. The process then returns to step S103.

(Operational Effects)

As described above, the aircraft tire management system according to the present embodiment can achieve the following operational effects.

The tire manufacturer 10 acquires the tire individual information on the aircraft tire 60 with the mobile terminal 51, and sends the acquired tire individual information to the management device 40. The tire individual information includes at least the tire ID, the information on the location where the tire ID is acquired, and the information on the date and time when the tire ID is acquired. The MRO-providing company 20 fits the aircraft tire 60 on the wheel 70. The MRO-providing company 20 acquires the tire individual information and the wheel individual information of the wheel-equipped tire 80 with the mobile terminal 51, and sends the acquired tire individual information and wheel individual information to the management device 40. The wheel individual information includes at least the wheel ID, the information on the location where the wheel ID is acquired, and the information on the date and time when the wheel ID is acquired. The airline 30 acquires the wheel individual information of the wheel-equipped tire 80 with the mobile terminal 52, and sends the acquired wheel individual information to the management device 40.

The management device 40 links the tire ID with the wheel ID. The management device 40 displays the tire management information including at least the tire ID, the location information, and the date and time information. Since the tire ID and the wheel ID are linked together in the present embodiment, the management device 40 receiving the wheel ID can also display the tire ID linked with the corresponding wheel ID. The operator 90 in the tire manufacturer 10 thus can easily track the aircraft tire 60 by inputting the tire ID regardless of the presence of different IDs to be managed. Namely, the operator 90 in the tire manufacturer 10 inputs the tire ID, so as to visually and immediately recognize the location and the state of the aircraft tire 60 at each point as shown in FIG. 4.

The management device 40 also displays a warning when the unshipped period in each of the warehouse 12, the MRO-providing company 20, and the airline 30 exceeds a predetermined period. The operator 90 in the tire manufacturer 10 can visually and immediately recognize the aircraft tire 60 exceeding the predetermined unshipped period. The operator 90 in the tire manufacturer 10 thus can manage the aircraft tire 60 efficiently.

Other Embodiments

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

The management device 40 has been illustrated with the case of managing the tire management information including the tire ID, the information on the location where the tire ID is acquired, and the information on the date and time when the tire ID is acquired, but is not limited to this case. For example, the management device 40 may manage manufacture information, retreading information, and delivery and shipping information of each aircraft tire 60. The management device 40 may further manage information on the identification number of an aircraft on which the aircraft tire 60 is mounted, and information on the position at which the aircraft tire 60 is installed.

The present embodiment has exemplified the case in which the management device 40 manages the location and the state of the aircraft tire 60 at each point, but is not limited to this case. For example, as shown in FIG. 6, the management device 40 may draw up combinations of the tire IDs and the wheel IDs enabling the tire-rim assembly, and display a table of the combinations. FIG. 6 illustrates the tire IDs indicated by T101 to T108, and the wheel IDs indicated by W101 to W106. FIG. 6 illustrates the case in which the tire T101 can be fitted on the wheels W101 to W106 via a rim. The indication "vacancy" in FIG. 6 indicates that the corresponding tire is not fitted on any wheel. The aircraft tire 60 is referred to simply as a "tire" below.

While the tires have various sizes, the operator 91 in the MRO-providing company 20 can visually and immediately recognize the possible combinations of the tire IDs and the wheel IDs enabling the tire-rim assembly according to the table shown in FIG. 6. The efficient tire-rim assembly thus can be ensured. When the operator 91 in the MRO-providing company 20 registers a combination of the tire T102 and the wheel W101 fitted together with a rim in the mobile terminal 51, the management device 40 inputs the tire ID "T102" in a "tire-in-use" column. The operator 91 in the MRO-providing company 20 thus can visually and immediately recognize which tire is in use.

The management device 40 may further manage the number of used days of the tires after being mounted on the body of the aircraft. For example, as shown in FIG. 7, the management device 40 may count the number of used days of the tires mounted on the aircraft so as to manage the conditions of the tires depending on the number of used days. As shown in FIG. 8, when the operator 92 in the airline 30 registers the tire T102 having been mounted on the body of the aircraft in the mobile terminal 52, the management device 40 inputs the information that the tire T102 is in use. The management device 40 then counts the number of days having passed since the tire T102 was mounted on the aircraft, and inputs the number of days counted. FIG. 8 illustrates the case in which the number of days for which the tire T102 has been mounted on the body of the aircraft is ten days. When the number of used days of the tire T102 mounted on the body of the aircraft is less than a predetermined number of days, the management device 40 inputs the condition of the tire T102 as "OK". The predetermined number of days can be set to, but not limited to, a reference number of used days (40 days) determined by the airline 30, for example.

As shown in FIG. 8, when the number of used days is 40 days or longer, the management device 40 inputs the condition of each of the tires T102 and T104 as "ERROR". The tires T102 and T104 input as "ERROR" are to be replaced soon, and new tires to be substituted for are thus required. The MRO-providing company 20 has stock at this point since the tires T107 and T108 are still available, as shown in FIG. 8. While the MRO-providing company 20 is out of stock after shipping the tires T107 and T108, the tire manufacturer 10 then ships new tires T109 and T110. The shortage of stock is thus cleared away, ensuring the efficient supply chain. Further, the operator 90 in the tire manufacturer 10 can predict that the tires T102 and T104 will need to be retreaded soon, so as to preliminarily prepare the operation for retreading to achieve immediate retreading. As shown in FIG. 9, the new tire T107 is then fitted on the wheel W101 via a rim so as to be mounted on the body of the aircraft. All of the tires are thus in the state of "OK".

The above embodiment has been illustrated with the method of acquiring various kinds of information on the aircraft tires 60 including the tire IDs via the mobile terminals 50, 51, and 52, but is not limited to this method. For example, the aircraft tire 60 may be put on a belt conveyor or a roller conveyor so as to acquire various kinds of information on the aircraft tire 60 by use of a camera or a bar code reader installed separately. In such a case, the belt conveyor or the roller conveyor only needs to be installed in each of the tire manufacturer 10, the MRO-providing company 20, and the airline 30, while the camera or the bar code reader separately installed in the belt conveyor or the roller conveyor is allowed to communicate with the management device 40. The mobile terminals 50, 51, and 52, and the belt conveyor (the roller conveyor) equipped with the camera or the bar code reader are each an acquisition device for acquiring various kinds of information on the aircraft tires 60.

This application is based upon and claims the benefit of priority from Japanese Patent Application No. 2017-159141, filed on Aug. 22, 2017, the entire contents of which are incorporated herein by reference.

REFERENCE SIGNS LIST

10 TIRE MANUFACTURER
11 PLANT

12 WAREHOUSE
20 MRO-PROVIDING COMPANY
30 AIRLINE
40 MANAGEMENT DEVICE
41 COMMUNICATION UNIT
42 INFORMATION PROCESSING UNIT
43 STORAGE DEVICE
44 DISPLAY
50, 51, 52 MOBILE TERMINAL
60 AIRCRAFT TIRE
70 WHEEL
80 WHEEL-EQUIPPED TIRE

The invention claimed is:

1. An aircraft tire management system used by a tire manufacturing facility which manufactures aircraft tires, an MRO-providing facility which fits and removes the aircraft tires with respect to wheels and overhauls and repairs the wheels, and an airline facility which uses the aircraft tires to be mounted on an aircraft, the system comprising:
   a management device capable of communicating with the tire manufacturing facility, the MRO-providing facility, and the airline facility through a network; and
   an acquisition device configured to acquire tire individual information on the respective aircraft tires and wheel individual information on the respective wheels;
   wherein the tire individual information includes at least tire identification information allotted to the respective aircraft tires, information on a location where the tire identification information is acquired, and information on a date and time when the tire identification information is acquired, and
   the wheel individual information includes at least wheel identification information allotted to the respective wheels, information on a location where the wheel identification information is acquired, and information on a date and time when the wheel identification information is acquired,
   the acquisition device being configured to:
      send the tire individual information acquired in the tire manufacturing facility to the management device;
      send the tire individual information and the wheel individual information on each aircraft tire fitted on the corresponding wheel acquired in the MRO-providing facility to the management device; and
      send the wheel individual information acquired in the airline facility to the management device,
   the management device being configured to:
      link the tire individual information on each aircraft tire with the wheel individual information on the corresponding wheel fitted together in accordance with the information acquired from the acquisition device; and
      output tire management information including at least the tire identification information, the information on the location, and the information on the date and time in accordance with the information acquired from the acquisition device,
   wherein the management device measures a time from a reception of the tire individual information to a reception of the wheel individual information, and links the tire individual information with the wheel individual information together when the measured time is shorter than a predetermined time.

2. The aircraft tire management system according to claim 1, wherein:
   the acquisition device sends, to the management device, the tire individual information or the wheel individual information acquired when each aircraft tire is delivered from the tire manufacturing facility to the MRO-providing facility, when the aircraft tire is shipped from the MRO-providing facility to the airline facility, when the aircraft tire is delivered to the airline facility from the MRO-providing facility, and when the airline tire is shipped from the airline facility to the MRO-providing facility; and
   the management device determines whether a period from delivery to shipment of each aircraft tire in the MRO-providing facility or the airline facility exceeds a predetermined period in accordance with the information acquired from the acquisition device, and provides notice when the period from the delivery to the shipment is determined to exceed the predetermined period.

3. The aircraft tire management system according to claim 1, wherein the management device presents a combination between the tire identification information on each aircraft tire and the wheel identification information on the corresponding wheel which can be fitted together.

4. An aircraft tire management device used by a tire manufacturing facility which manufactures aircraft tires, an MRO-providing facility which fits and removes the aircraft tires with respect to wheels and overhauls and repairs the wheels, and an airline facility which uses the aircraft tires to be mounted on an aircraft, the device comprising:
   a communication unit configured to communicate with the tire manufacturing facility, the MRO-providing facility, and the airline facility through a network;
   an acquisition unit configured to acquire tire individual information including at least tire identification information allotted to the respective aircraft tires, information on a location where the tire identification information is acquired, and information on a date and time when the tire identification information is acquired, and wheel individual information including at least wheel identification information allotted to the respective wheels, information on a location where the wheel identification information is acquired, and information on a date and time when the wheel identification information is acquired;
   an information processing unit configured to link the tire individual information on each aircraft tire with the wheel individual information on the corresponding wheel fitted together in accordance with the information acquired by the acquisition unit; and
   an output unit configured to output tire management information including at least the tire identification information, the information on the location, and the information on the date and time in accordance with the information acquired by the acquisition unit,
   wherein the information processing unit measures a time from a reception of the tire individual information to a reception of the wheel individual information, and links the tire individual information with the wheel individual information together when the measured time is shorter than a predetermined time.

5. A non-transitory computer-readable storage medium storing an aircraft tire management program used by a tire manufacturing facility which manufactures aircraft tires, an MRO-providing facility which fits and removes the aircraft tires with respect to wheels and overhauls and repairs the wheels, and an airline facility which uses the aircraft tires to be mounted on an aircraft, the program causing a computer to execute the steps of:

communicating with the tire manufacturing facility, the MRO-providing facility, and the airline facility through a network;
acquiring tire individual information including at least tire identification information allotted to the respective aircraft tires, information on a location where the tire identification information is acquired, and information on a date and time when the tire identification information is acquired, and wheel individual information including at least wheel identification information allotted to the respective wheels, information on a location where the wheel identification information is acquired, and information on a date and time when the wheel identification information is acquired;
linking the tire individual information on each aircraft tire with the wheel individual information on the corresponding wheel fitted together; and
outputting tire management information including at least the tire identification information, the information on the location, and the information on the date and time,
wherein the step of linking includes measuring a time from a reception of the tire individual information to a reception of the wheel individual information, and linking the tire individual information with the wheel individual information together when the measured time is shorter than a predetermined time.

* * * * *